United States Patent [19]

Lin

[11] Patent Number: 5,337,101

[45] Date of Patent: Aug. 9, 1994

[54] METHOD AND APPARATUS FOR PRODUCING STEREOSCOPIC EFFECTS

[76] Inventor: Shao-Chia Lin, 6th Fl., No. 15-1, Sec. 2, Keelung Rd., Taipei, Taiwan

[21] Appl. No.: 4,832

[22] Filed: Jan. 19, 1993

[51] Int. Cl.$^5$ .................. G03B 35/08; G03B 29/00
[52] U.S. Cl. ............................ 354/113; 354/81
[58] Field of Search .................. 354/112, 113, 80, 81

[56] References Cited

U.S. PATENT DOCUMENTS

| | | | |
|---|---|---|---|
| 3,045,573 | 7/1962 | Wanner | 354/113 |
| 3,269,291 | 8/1966 | Bernier | 354/113 |
| 3,608,458 | 9/1971 | Ratliff, Jr. | 354/113 |
| 3,687,048 | 8/1972 | Richter | 95/98 |
| 3,722,983 | 3/1973 | Brassington | 350/135 |
| 3,731,607 | 5/1973 | Mandler | 95/86 |
| 4,431,290 | 2/1984 | Kennedy | 354/113 |
| 4,650,305 | 3/1987 | Hines | 354/113 |
| 4,725,863 | 2/1988 | Dumbreck et al. | 354/113 |

*Primary Examiner*—Michael L. Gellner
*Assistant Examiner*—Nicholas J. Tuccillo
*Attorney, Agent, or Firm*—Patterson & Keough

[57] ABSTRACT

An apparatus for providing stereoscopic effects includes a cassette and a projector. The cassette defines a chamber for enclosing tow strips of film. A first passage is in communication with the chamber and diverges into two second passages so that an edge is formed between the second passages. A first gear is mounted below the chambers. A second gear is engaged with the first gear. Two separate wheels are co-axially linked to the second gear. A plurality of teeth radially project from each wheel. The teeth engage with perforations which are defined in strips of film. When the first gear is rotated, the strips of film are fed from the chamber along the first passage by means of the wheels. The strips of film are then separated from each other by means of the edge and are respectively fed along the second passages. The projector has two pairs of transparent panels which define two third passages which are in communication with the second passages. Two chambers are in communication with the third passages for containing the strips of film. Two light sources project light through the pairs of transparent panels for providing illuminated images. The projector further uses two lenses through which light passes.

2 Claims, 7 Drawing Sheets

METHOD AND APPARATUS FOR PRODUCING STEREOSCOPIC EFFECTS

BACKGROUND OF INVENTION

1. Field of invention

The present invention relates to a method for producing stereoscopic effects.

2. Related Prior Art

As well known, a stereoscopic effect is achieved when two frames of orthochromatic film bearing two separated images of one object simultaneously taken from two slightly different angles are simultaneously respectively viewed by the eyes of one viewer.

Two separate cameras can be used to take two separate images of one object on two frames of orthochromatic film from slightly different angles. However, it would not be possible to simultaneously take the images from appropriate angles without skills.

One single camera with two lens has been used to simultaneously take two separate images of one object on two frames of orthochromatic film from slightly different angles. However, the images of one object being too far from nor too close to the camera cannot be well taken as the distance and the angle between the lens cannot be adjusted. Such cameras are also expensive as only being used for such a purpose and, therefore, not mass produced.

Regardless of whether two ordinary cameras or one camera with two lenses are used, strips of orthochromatic film are cut into slides after being developed. Each pair of slides must be joined together. Only one pair of slides can be sited in a machine at one time for providing one stereoscopic effect. That is, a pair of slides can be sited in the machine only when a previous pair of slides is taken out of the machine. This is time consuming. Therefore, the present invention is intended to solve the above-mentioned problems.

SUMMARY OF INVENTION

It is an object of the present invention to provide a rack for simultaneously carrying two cameras, wherein the rack has a slot so that one camera can be moved relative to the remaining camera and a number of indices for helping a player to have appropriate angles between the cameras for taking better images.

It is another object of the present invention to provide an apparatus for displaying two strips of orthochromatic film so that pairs of frames respectively of the strips of orthochromatic film simultaneously taken of one object can be viewed for providing stereoscopic effects.

It is still another object of the present invention to provide a method for producing stereoscopic effects.

For a better understanding of the present invention and objects thereof, a study of the detailed description of the embodiments described hereinafter should be made in relation to the accompanying drawings.

DETAILED DESCRIPTION OF PREFERRED EMBODIMENT

The present invention will be described in detail with reference to the drawings illustrating embodiments thereof.

Figure 1:
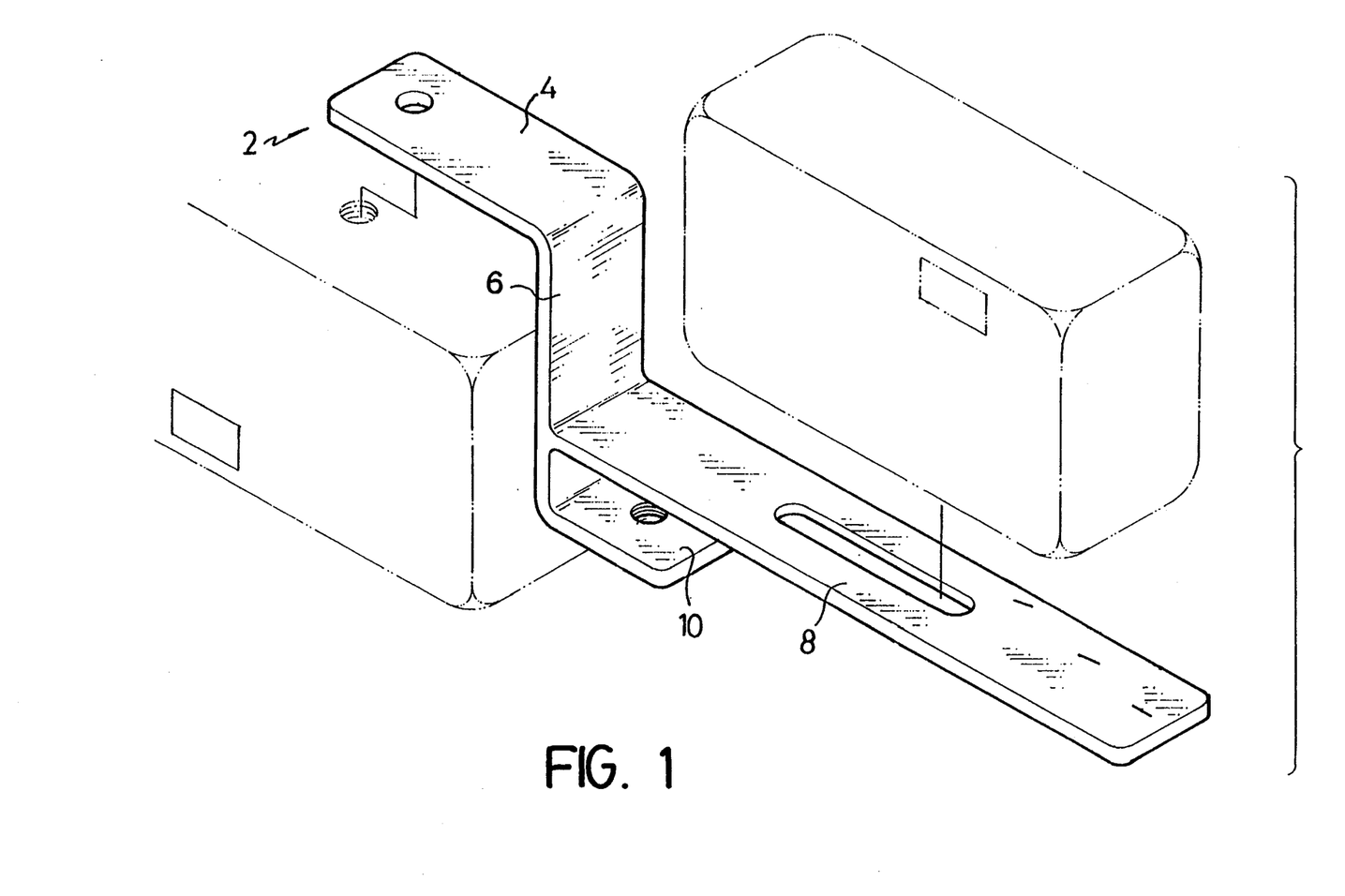
FIG. 1 is a perspective view of a rack for carrying two separate cameras in accordance With the preferred embodiment of the present invention.
Figure 2:
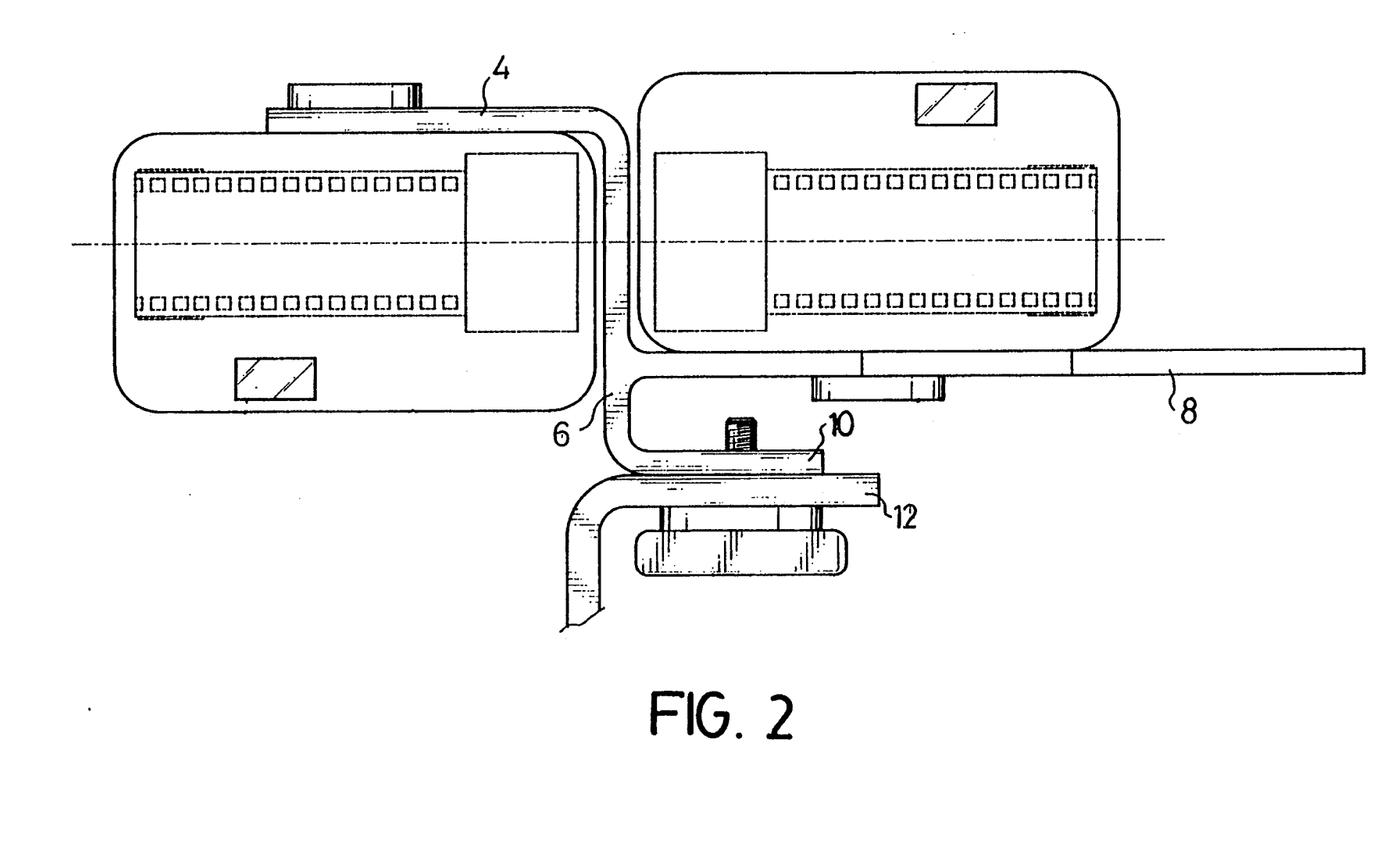
FIG. 2 is a planar view of a rack for carrying two cameras in accordance with the preferred embodiment of the present invention.

Initially referring to FIGS. 1 and 2, a rack 2 has a first camera-mounting member 4 integrating with a member 6 at 90°. The member 6 integrates with a second camera-mounting member 8 at 90° and integrates with a member 10 at 90°. The members 4, 6, 8 and 10 have flat configurations. The camera-mounting members 4 and 8 project from the member 6 at opposite directions. The first camera-mounting member 4 extends at a higher level than the second camera-mounting member 8 extending at a higher level than the member 10.

The first camera-mounting member 4 defines a hole. In use, a first camera defining a threaded hole in its bottom is inverted and a threaded bolt integrating with a knob is inserted through the hole defined in the first camera-mounting member 4 so as to be engaged in the threaded hole defined in the first camera. Thus, the first camera is mounted beneath the first camera-mounting member 4.

The second camera-mounting member 8 defines a slot extending along a length thereof. A second camera defining a threaded hole in its bottom is maintained upright. A threaded bolt integrating with a knob protrudes through the slot defined in the second camera-mounting member 8 in order to engage in the threaded hole defined in the second camera. The second camera is mounted on the second camera-mounting member 8.

The member 10 defines a threaded hole. A plate 12 integrating with a tripod (not shown) defines a hole. A threaded bolt integrating with a knob protrudes through the hole defined in the plate 12 so as to engage in the threaded hole defined in the member 10. Thus, the rack 2, together with the cameras, is mounted on the tripod.

As clearly seen in FIG. 2, a strip of orthochromatic film is stored in a cartridge mounted in the first camera, and a strip of orthochromatic film is stored in a cartridge mounted in the second camera. The first camera is inverted so that the strips of orthochromatic film are fed from the cartridges in opposite directions. However, the first camera will not necessarily be inverted if the strips of orthochromatic film can be fed in opposite directions. The reason for feeding the strips of orthochromatic film in opposite directions will be given later.

Figure 3:
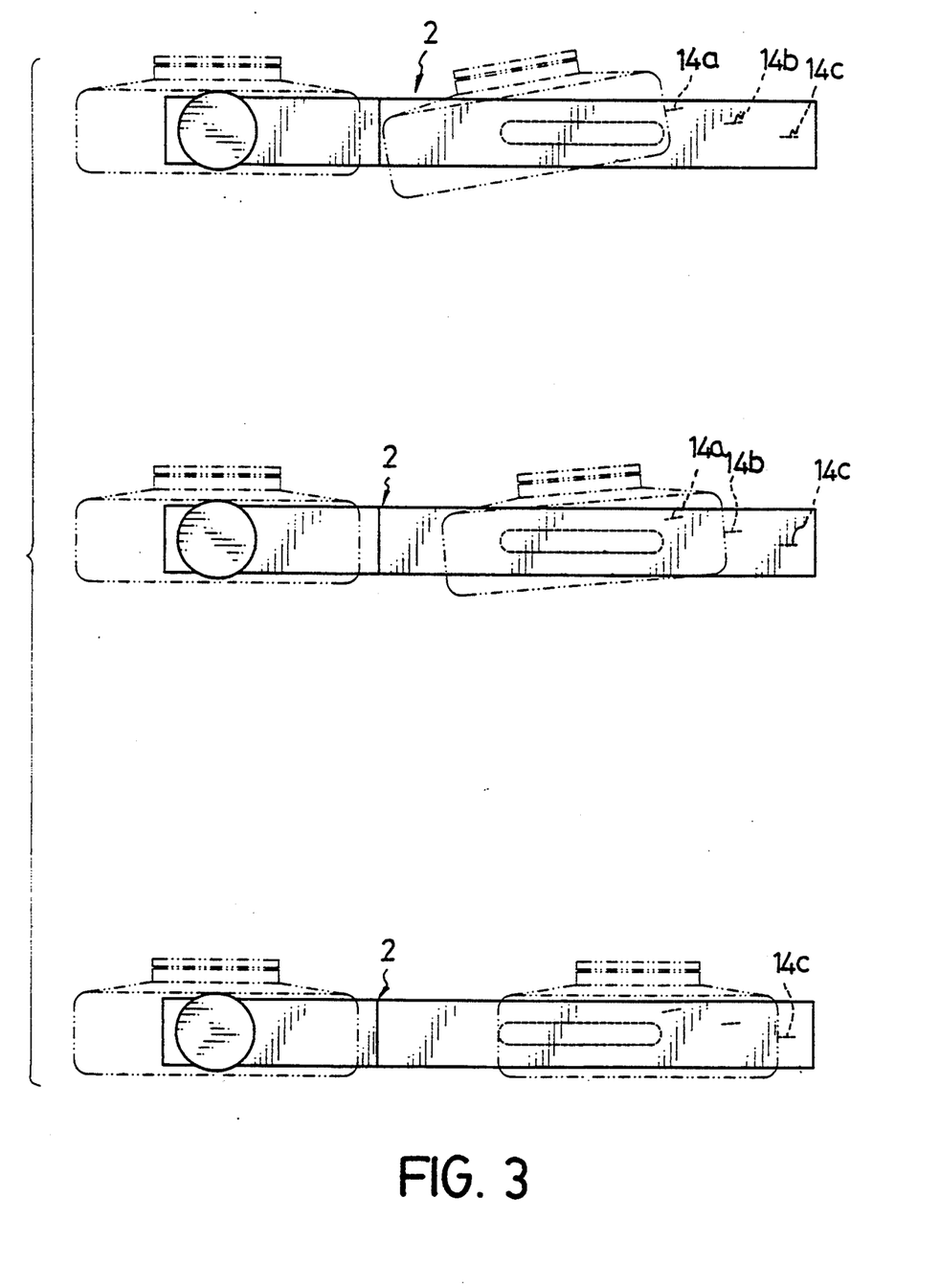
FIG. 3 shows a rack carrying two cameras at different positions relative to each other for clearly taking images of objects at different distances therefrom.

Additionally referring to FIGS. 3a, 3b and 3c, a number of indices are formed on the second camera-mounting member 8. In an example, there are three indices 14a, 14b and 14c. To shoot an object relatively close to the cameras, the second camera is sited relatively close to the first camera and a certain point of the second camera is aligned to the index 14a. To shoot an object at an intermediary distance from the camera, the second camera is sited at an intermediary distance from the first camera and the certain point of the second camera is aligned to the index 14b. To shoot an object relatively far from the cameras, the second camera is sited relatively far from the first camera and the certain point of the second camera is aligned to the index 14c. Thus, clear images of the objects can always be captured regardless of their distances from the cameras.

Figure 4:
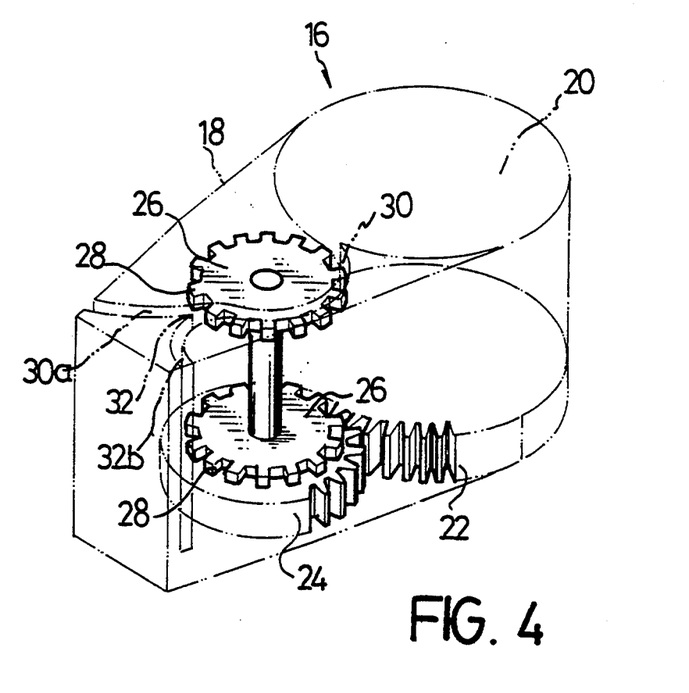
FIG. 4 is a perspective view of a cassette for storing two rolls of orthochromatic film so that each pair of corresponding frames of orthochromatic film can be seen at the same time in accordance with the preferred embodiment of the present invention.

Additionally referring to FIG. 4, in accordance with a first embodiment of the present invention, a cassette 16 has a casing 18. A first portion of the casing defines a chamber 20 with a cylindrical configuration and an opening communicating with the chamber 20. Two strips of orthochromatic film are formed into a single roll in order to be sited in the chamber 20.

A gear 22 is rotatably mounted in the chamber 20 below the roll of orthochromatic film and is partially exposed to the exterior of the casing 18 through the opening. A gear 24 is rotatably mounted in a second portion in the casing 18 for engaging with the gear 22. A pair of wheels 26 with sprockets 28 is co-axially securely attached to the gear 24. The sprockets 28 engage with the perforations defined in the strips of orthochromatic film. A passage 30 communicating with the chamber 20 extends along the periphery of the pair of wheels 26 and diverges into two passages 30a and 30b at an edge 32. Thus, the strips of orthochromatic film are fed along the passage 30 from the chamber 20. The edge 32 separates the strips of orthochromatic film from each other so that one strip of orthochromatic film is fed along the passage 30a and that the remaining strip of orthochromatic film is fed along the passage 30b.

Figure 5:
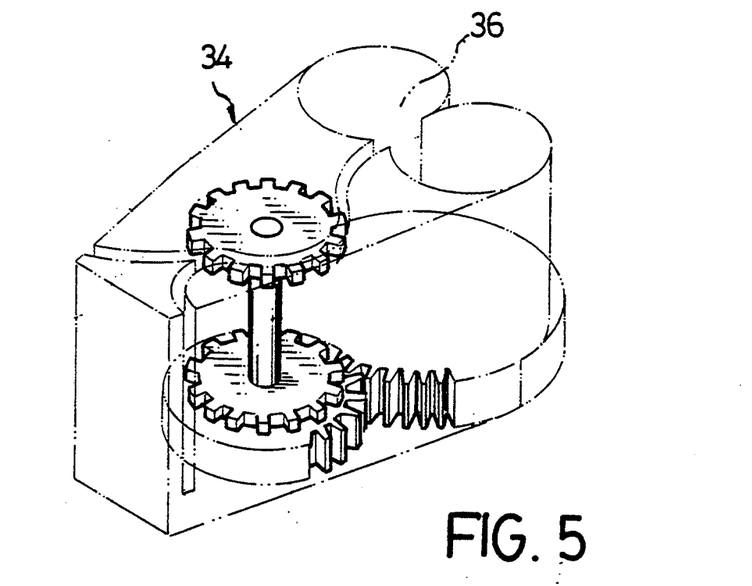
FIG. 5 is a perspective view of a cassette for storing two rolls of orthochromatic film so that each pair of corresponding frames of orthochromatic film can be seen at the same time in accordance with a second embodiment of the present invention.

Additionally referring to FIG. 5, a cassette 34 in accordance with a second embodiment of the invention is similar to the cassette 16 except that the cassette 34 has two chambers 36 respectively for containing two strips of orthochromatic film.

Figure 6:
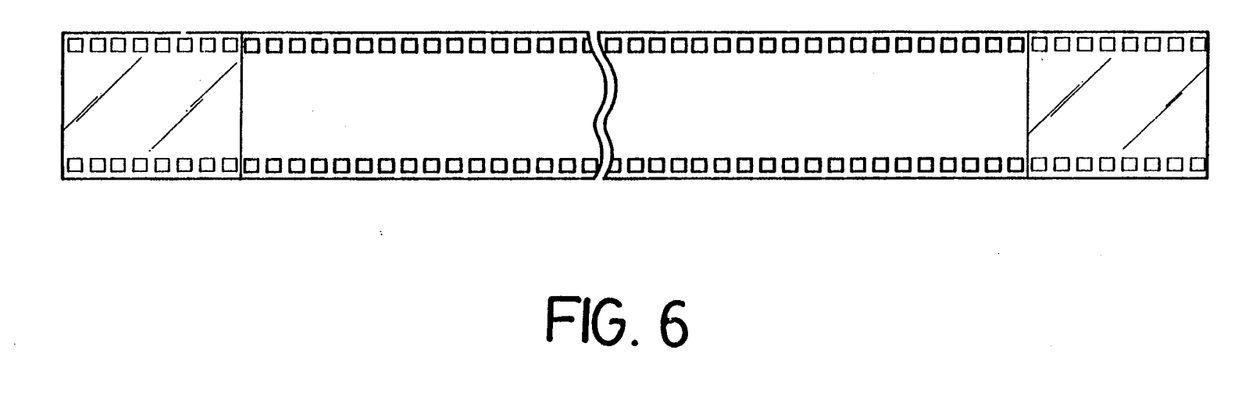
FIG. 6 is a planar view of a strip of orthochromatic film adhered with two patches at its two ends in accordance with the preferred embodiment of the present invention.

Referring to FIG. 6, after the processing of film, tips of strips of orthochromatic film are preferably adhered with patches for blocking the perforations defined therein. The sprockets 28 are restrained from engaging in those blocked perforations. Thus, the strips of orthochromatic film are restrained from being further retracted into the chambers 20 or 36 when the strips of orthochromatic film are almost completely retracted into the chambers 20 or 36. Thus, the strips or orthochromatic film are also restrained from being further fed along the passage 30 when the strips of orthochromatic film are almost completely moved out of the chambers 20 or 36.

Figure 7:
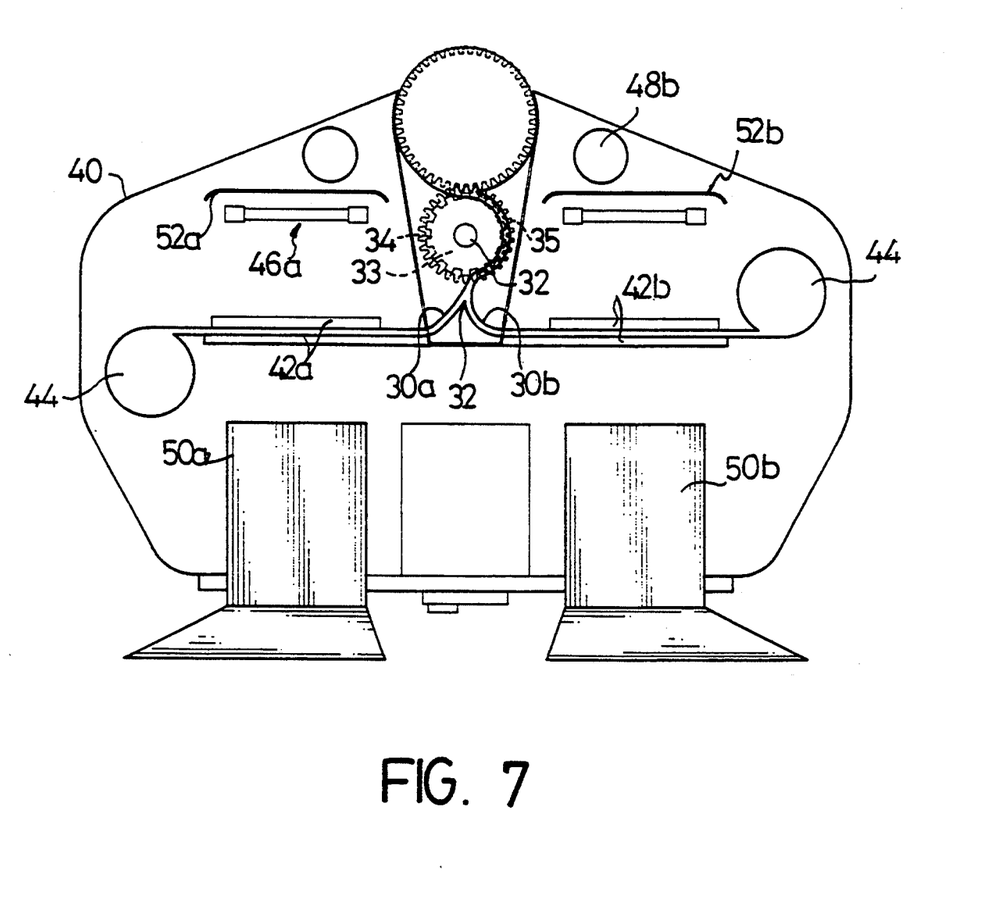
FIG. 7 is a top view of a machine incorporating the cassette as shown in FIG. 4, for simultaneously displaying two frames of orthochromatic film bearing two images of one object from slightly different angles.

Additionally referring to FIG. 7, a projector 38 has a casing 40. One cassette 16 containing two strips of orthochromatic film is sited in the casing 40. Within the casing 40, two pairs of transparent panels 42a and 42b respectively define two passages therebetween. The passages defined between the pairs of transparent panels 42a and 42b respectively communicate with the passages 30a and 30b.

The rear portion of the casing 40 defines an opening through which the gear 22 is partially exposed to the exterior thereof. Thus, the strips of orthochromatic film can be fed from the chamber 20 along the passage 30 when the gear 22 is rotated. As the gear 22 continues to be rotated, the edge 32 separates the strips of orthochromatic film from each other so that the strips of orthochromatic film are respectively fed along the passages 30a and 30b and sequentially along the passages respectively defined between the pairs of transparent panels 42a and 42b. The strips of orthochromatic film are then respectively fed into two chambers 44 formed within the casing 40.

In the casing 40, two light sources 46a and 46b powered by means of two power sources 48a and 48b are mounted after and aligned with the pairs of transparent panels 42a and 42b. Light emitted from the light sources 46a and 46b respectively passes through the pairs of transparent panels 42a and 42b and two frames of orthochromatic film bearing two images of one object simultaneously taken from slightly different angles. Thus, a stereoscopic effect is achieved through two lens 50a and 50b mounted in a front portion of the casing 40. Preferably, two reflectors 52a and 52b are respectively mounted behind the light sources 46a and 46b for providing a better efficiency for lighting.

Figure 8:
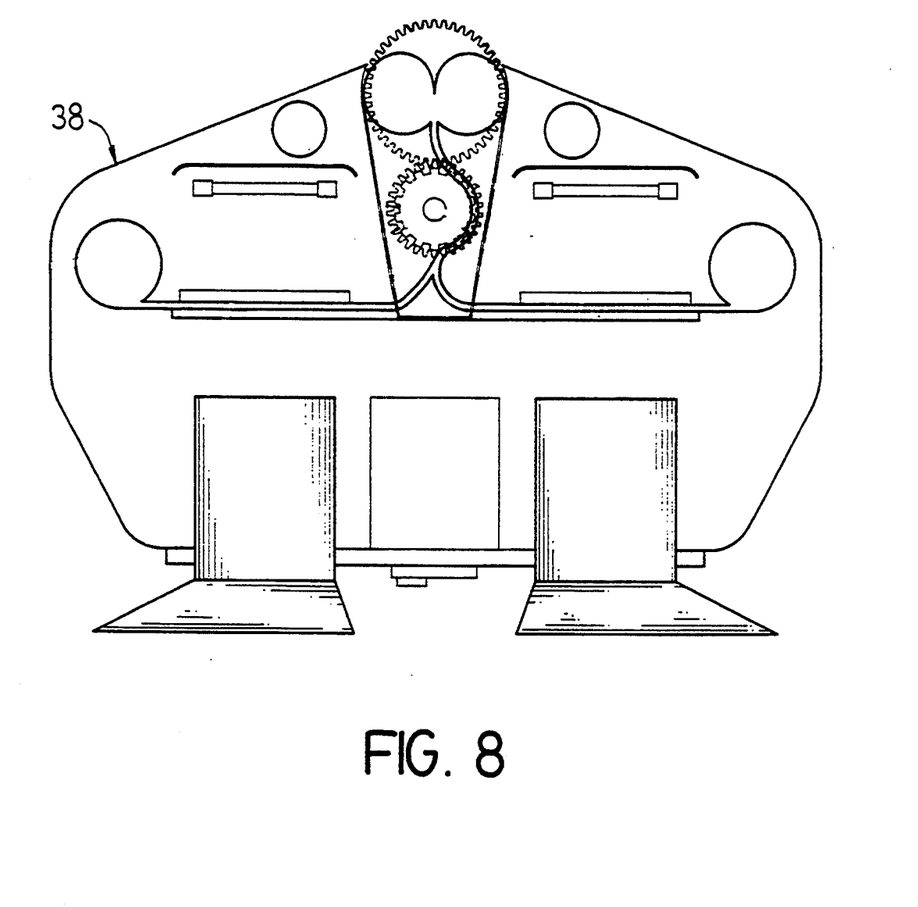
FIG. 8 is a top view of a machine incorporating the cassette as shown in FIG. 5, for simultaneously displaying two frames of orthochromatic film bearing two images of one object from slightly different angles.

Additionally referring to FIG. 8, the cassette 34 is incorporated in the projector 38. As the operation of the cassette 34 is identical to that of the cassette 16, further details thereof will not be necessary.

The reason for retrieving two strips of orthochromatic film in opposite directions as shown in FIG. 2 is that when the strips are fed from the cartridge 16 as shown in FIG. 7 (or from the cartridge 34 as shown in FIG. 8) in opposite directions, each pair of frames can be positively displayed, not inverted or reversed.

While the present invention has been explained in relation to its preferred embodiment, it is to be understood that variations thereof will be apparent to those skilled in the art upon reading this specification. Therefore, the present invention is intended to cover all such variations as shall fall within the scope of the appended claims.

I claim:

1. An apparatus for providing stereoscopic effects, comprising:

a cassette comprising:
 a chamber for enclosing two strips of film;
 a first passage communicating with said chamber and diverging into two second passages at an edge;
 a first gear mounted below said chamber;
 a second gear engaging with said first gear; and
 two separate wheels co-axially connecting with said second gear and comprising sprockets radially protruding therefrom for engaging in the perforations of the strips of film so that the strips of film are fed from said chamber along said first passage by means of said wheels and are separated from each other and respectively induced along said second passages when said first gear is rotated; and a projector comprising:

two pairs of transparent panels defining two third passages communicating with said second passages for the strips of film;

two cheers communicating with said third passages for containing the strips of film;

two light sources projecting light through said pairs of transparent panels for providing visions; and two lenses through which the light passes.

2. A method for producing stereoscopic effects, comprising the following steps:

loading two cameras respectively with two cartridges respectively containing two rolls of orthochromatic film;

taking two images of one object from two slightly different angles by means of said cameras in a way that said strips of orthochromatic film are extracted from said cartridges in opposite directions;

developing said strips of orthochromatic film;

containing said strips of orthochromatic in a cassette in accordance with claim 2;

mounting said cassette in a projector; and retrieving said strips of orthochromatic film from said cassette so that pairs of frames can be viewed.

* * * * *

UNITED STATES PATENT AND TRADEMARK OFFICE
CERTIFICATE OF CORRECTION

PATENT NO. : 5,337,101
DATED : August 9, 1994
INVENTOR(S) : Shao-Chia Lin

It is certified that error appears in the above-indentified patent and that said Letters Patent is hereby corrected as shown below:

Abstract - Line 3
. . . chamber for enclosing <u>two</u> strips of film.

Abstract - Line 7
should be <u>chamber</u> and not plural

Column 1, Line 64
should be a lower case <u>with</u>

Claims - Column 5, Line 5
cheers should be <u>chambers</u>

Signed and Sealed this

Thirteenth Day of December, 1994

Attest:

BRUCE LEHMAN

Attesting Officer   Commissioner of Patents and Trademarks